United States Patent [19]

Potter et al.

[11] Patent Number: 5,399,086
[45] Date of Patent: Mar. 21, 1995

[54] GAS-FIRED AIR HEATER ASSEMBLY

[75] Inventors: Gary J. Potter, St. Charles County; Samuel M. Baxter, St. Louis County, both of Mo.

[73] Assignee: Cambridge Engineering, Inc., Chesterfield, Mo.

[21] Appl. No.: 128,830

[22] Filed: Sep. 29, 1993

[51] Int. Cl.[6] .............................................. F24H 3/02
[52] U.S. Cl. ..................... 432/222; 126/110 B; 126/110 C; 126/110 D
[58] Field of Search ............... 432/222; 126/110 B, 126/110 C, 110 D

[56] References Cited

U.S. PATENT DOCUMENTS

| | | | |
|---|---|---|---|
| 2,518,021 | 8/1950 | Keay | 432/222 |
| 3,055,145 | 9/1962 | Lindsay | 432/222 |
| 4,651,711 | 3/1987 | Velie | 432/222 |
| 4,674,475 | 6/1987 | Powis | 432/222 |
| 4,993,944 | 2/1991 | Potter et al. | 432/222 |

Primary Examiner—Carroll B. Dority
Attorney, Agent, or Firm—Paul M. Denk

[57] ABSTRACT

In a direct gas-fire heater assembly having a generally box-like housing with a grate-like floor with a conventional gas regulator, a gas port mounted within a box-like shroud, the shroud having one side with a predetermined number, shape and size of primary combustion air inflow orifices to direct primary combustion air toward the gas port. A burner is mounted on the shroud over the gas port. The area above the burner and adjacent to it contains an ignition device and flame sense rod as well as a pair of opposed and particularly oriented flame shields on each side of the flame orifice. One each of a pair of opposed baffle-type deflectors is arranged on each side and just above the flame shield so as to form a combustion chamber as well as a path for secondary air flow to a downstream chamber. An additional flame deflector is formed on one baffle-type deflector to deflect the flame toward the blower area.

17 Claims, 4 Drawing Sheets

GAS-FIRED AIR HEATER ASSEMBLY

BACKGROUND OF THE INVENTION

This invention relates generally to a direct gas-fired Industrial, commercial, or related type of heater, or more specifically to a heater to be used for heating substantially sized buildings, such as may be used and applied in the foregoing manner. Furthermore, because of the precise control provided for the gas-fired heater of this invention, and through its assembly of various components furnishes a substantial volume in capacity of heat with reduced generation of carbon monoxide, the heater of this invention may further be used and applied for agricultural purposes, such as in barns, or other confinement buildings, such as for use for housing and raising swine, applied in poultry, production, or for keeping other livestock, and reduce the incidence of harm to such animals because of the high efficiency of operations of this heater, with reduced generation of deleterious gases. Thus, the heater of this invention also has field of use application for agricultural purposes, such as in a hog house or a poultry house, or the like. The invention herein described is not a heat exchanger per se, since the combustion of the gas after ignition takes place directly within the air stream being heated, and not by conduction, with the heated air being channeled directly for discharge into the housing space to be warmed.

The improvement of the invention is that it further adds to the efficiency of combustion within such heater so as to work more effectively and safely in producing the quantities of heated air that may be needed to heat an agricultural-type building with effectively decreasing the production of noxious gases and also adding to safety.

The heating equipment of this invention, in which the direct fire burner of a novel type is enclosed contains no flue and all of the bi-products of combustion are released directly into the heated air which is then directly discharged into the space being heated. Since one application of this type of heater is to employ the heater in a small enclosed space, such as a hog house or poultry house, it is important to reduce the creation and release of deleterious exhaust and other gases, either in the form of carbon monoxide or nitrogen dioxide, so that the air remains breathable by the farm animals and by the farmer working in such an enclosed space. Furthermore, since the heater of this invention can also be applied for horticultural purposes, this heater can be installed for precisely regulating the heat generated and needed for warming a greenhouse, or the like, during usage.

The improved heater of this design substantially reduces to a minimum the generation of these deleterious noxious gases resulting from combustion.

Direct fire gas heaters typically are constructed in a variety of configurations. In the majority of such heaters, as manufactured, the burner is arranged upstream of a fan which functions in the manner of a draw-through type of arrangement. A number of other manufacturers position their burners down stream of the fan or blower discharge in what is defined as a blow-through configuration. Examples of the various types of devices can be seen in U.S. Pat. Nos. 5,083,918, 4,929,541 and 4,993,944 all to Potter et al. and in U.S. Pat. No. 3,630,499 which are owned by a common assignee of the improved burner of the current design.

Other types of burner arrangements that exist in the prior art can readily been seen in the Ehrich U.S. Pat. No. 3,485,043, the Coppin et al. U.S. Pat. No. 4,573,907 and in the Childs, U.S. Pat. No. 3,993,449, as well as the Pillard U.S. Pat. No. 3,885,919. Furthermore the Canadian Pat. No. 560,916 to Kind, shows a form of a gas burner contained within a heating arrangement which incorporate the flame zone of a combustion chamber.

In addition, other burner assemblies are shown in prior U.S. Patents to Lewis, U.S. Pat. No. 4,523,905; Coppin, U.S. Pat. No. 4,869,665; and Kikutami et al. U.S. Pat. No. 4,610,626.

As is well known in the art, the performance characteristics of the burner necessarily determines the operational range of the heating equipment to gauge whether it is in compliance with various requirements of the American National Standards Institute (ANSI) governing the functioning of the direct gas-fired industrial heaters. The burner design for which patent protection is sought herein is utilized in the industrial heating appliance, more specifically, in an agricultural type use or other industrial or commercial heating appliance. Various standards establish the criteria for maximum amounts of bi-products of the combustion, such as carbon monoxide, carbon dioxide, nitrogen dioxide, and aldehydes which can be discharged into the heated air. Obviously, such controls are done for the purpose of regulating the air quality of the building in which the equipment is to be installed for the safety to the worker as well as others.

Generally the air flow through a heater of this type design, and the temperature rise that occurs for the air that is being heated, determines the heating capacity of the subject unit. The air flow is directly related to the fan selected, the motor horsepower of the unit driving the fan, and the static pressure on the system during functioning. The temperature rise is controlled by the gas flow delivered to the burner, at any given air flow rate for the capacity air that is been blown through the unit, as induced by the blower.

As previously explained, the ANSI standards generally provide for a minimum requirement that must be met by units of this design. These standards generally allow for specific maximum additive levels of four particular bi-products of combustion, as previously identified, that may be released from the heating unit of this type during functioning. The products of combustion as previously explained and their respective allowable levels are as follows:

carbon dioxide-4,000 parts per million (ppm);
carbon monoxide-5 parts per million (ppm);
nitrogen dioxide-0.50 parts per million (ppm);
aliphatic aldehyde-1.0 parts per million (ppm);

As can be understood, these are extremely low levels and therefore it is very important that a burner of this design be efficiently and effectively designed for the purpose of minimizing the creation of these combustion by-products. These particular chemical compounds, which are generally recognized in the trade as undesirable by-products from the functioning of heating units of this type, and their gases of combustion are basically recognized as unwanted by-products, which, if they can be reduced to an absolute minimum, not only adds to the safety to all people or animals within the heated space but enhances the quality of operation of the heating unit. The unit of this particular invention has been designed to provide for a minimization of the output of these undesirable by-products through the uniquely enhanced design and particular characteristics and features constructed to improve the heater of this invention.

For example, it has been previously determined through testing that there are three major factors that effect the production of carbon monoxide within the combustion process. The quantity of air that is provided to support combustion must closely match what is needed. If too little air is allowed to mix with the gas within the burner/combustion chamber, incomplete combustion occurs and noxious gases escape into the heated area. The rise in the level of carbon monoxide can easily be measured in the discharge airstream. On the other hand, if too much combustion air is introduced, quenching of the flame can occur and this abrupt cooling also causes incomplete combustion. By controlling the volume of primary and secondary combustion air, it can be shown that the deterious combustion products can be minimized. Thus, an equilibrium point must be attained and the amount of air that flows into the burner assembly and around thee early portion of the flame must be limited within a narrow window to allow as much as needed but prevent excess flow from quenching the flame.

An additional factor which affects the development of carbon monoxide related to the quenching phenomena of the flame and is due to the abrupt cooling of the flame after it exits from the combustion zone. Excess air is generally always provided in warm air heater applications. From the preceeding paragraph, it is important that the excees air is bypassed around the combustion zone. If the velocity of the bypass air is too high or if the flow pattern of the bypass air is overly disruptive, the excess air could impinge or penetrate the flame tips that are extending beyond the combustion zone. This type of air impingement or penetration into the flame tips causes a quenching of the flame by its premature cooling below the reaction temperature which can significantly increase carbon monoxide. Thus, a similar equilibrium point must be maintained between the bypass excess air and the primary and secondary combustion air and, in addition, the air flow pattern of the bypass air should not be intrusive to the flame.

The third known factor which affects the development of carbon monoxide and to a significant degree nitrogen dioxide relates to flame imprigement on the metal surfaces (wall, baffles or diverters) of the firebox. The flame impingement on the cooler metal surface sometimes present in turbulant flame patterns relates to the abrupt cooling phenomena which again results in the creation of carbon monoxide. Where flame impingement is allowed to occur on a more continuous basis, the metal surface will overheat creating hot spots which act to generate higher levels of nitrogen dioxide in the discharge air stream. Air flow barriers are provided which prevent flame impingement on the metal surfaces of this design in a manner so as not to overly cool the flame by this technique.

In atmospheric gas type burner applications, primary combustion air is premixed with the gas by the momentum of the jet of gas expelled by the gas orifice. The text on the subject of atmospheric burner design indicates the normal range for the percentage or primary air, as a percent of theoretical, mixing with the gas is between 35% and 65%. By locating the burner and combustion zone on the suction side of the fan (negative static pressure side in relationship to normal room pressure) while leaving the primary air intake at room pressure, the percentage of primary air, as a percent of theoretical that premixes with the gas within the confines of the burner, is increased significantly without experiencing the undesirable characteristic of flame lifting away from the outlet port. As a result, much less secondary combustion air is required to achieve complete combustion. With the requirement for less secondary air, baffling may be used to restrict the secondary air flow volume and velocity, such that the secondary air does not intrude into the inner cone of flame.

As can be understood from the above discussion, the manner in which air is introduced into the combution zone is just as important as how much air is provided to support combustion. In the design requirements of this appliance, one must also be concerned with the generation of undesirable combustion bi-products when the heater is operated for an extended period of time with the access door in the opened position. The air flow pattern is significantly different with the door open than with the access door closed. Design solutions were developed through imperical testing which minimized the creation of deleterious exhaust or other gases.

SUMMARY OF THE INVENTION

It is therefore an object of this invention to provide a direct gas-fire burner assembly wherein the primary air inlets directed to the burner assembly are surrounded by a protective shroud so as to control the primary air flow to the burner and prevent quenching of the flame.

It is another object of the present invention to provide a direct gas-fire burner assembly wherein the primary air inlet orifice cooperating with the aforestated shroud is of such size and configuration so as to allow an efficient amount of primary air inflow into the burner manifold so as to furnish efficient combustion proximate the burner and decrease the amount of noxious by-products generated.

It is a further object of the present invention to provide a direct gas-fire burner assembly employing a series of baffles so as to divert secondary air into the combustion chamber, as well as directing excess air away from the flame to avoid flame quenching, and to effect more efficient combustion downstream from the burner.

It is a still further object of the present invention to provide a direct gas-fire burner assembly wherein a series of diverter baffles are employed so as to deflect the flame from the burner through the combustion chamber toward a heating chamber so as to create more efficient combustion downstream from the burner and avoiding flame impingement with the metal components of the firebox.

It is still another object of the present invention is to provide a direct gas-fire burner assembly wherein the baffle assembly deflects the flame before it reaches the blower assembly thereby increasing the responsiveness of the safety high-limit device and decreasing risk of fire.

Yet another object of the invention is to provide a direct gas-fire burner assembly which is easy and economical to assemble, operates efficiency and is well suited for its intended purpose.

It is still another object of this invention to provide a gas-fired air heater burner assembly which can be directly applied within agricultural installations such as in the poultry or hog house, or for warming other livestock, such as cattle, or buildings housing stalled horses.

Yet another object of this invention is to provide a gas-fired air heater burner assembly that can be applied in an industrial and commercial applications to heat large buildings in which other business operations are conducted.

Generally stated, a direct gas-fire burner assembly is provided having a box-like housing with a grate-like floor on which is mounted a conventional gas regulator and gas input valve, a gas port mounted within a box-like shroud, the shroud designed having one side with a predetermined number, shape and size of primary combustion air inflow openings therein to direct primary combustion air toward said gas port. An atmospheric burner design with an elongated outlet slot is cooperatively mounted on the shroud over the gas port at the burner venturi. The area adjacent to the burner outlet contains an ignition device and flame rod, as well as a pair of opposed flame shields disposed on each side of the outlet orifice of the burner. A pair of opposed baffle-type deflectors are arranged on each side of and just above the shields to form a combustion chamber and to cooperate with the shields to direct secondary air of combustion downstream in the burner assembly. An additional deflector is arranged on one of the baffle-type deflectors to deflect the flame coming out of the burner manifold toward a second chamber formed proximate the blower. The gas-fired heater burner of this invention can be installed within any building suspended above the ground, where it obtains its intake of air thereat, or in certain other installations, it may be suspended from the ceiling, and have an air intake that extends to the outside, so as to draw in ambient air for generation of the flame and production of the heat required internally of any building in which it is installed.

DESCRIPTION OF THE PREFERRED EMBODIMENT

Figure 1:
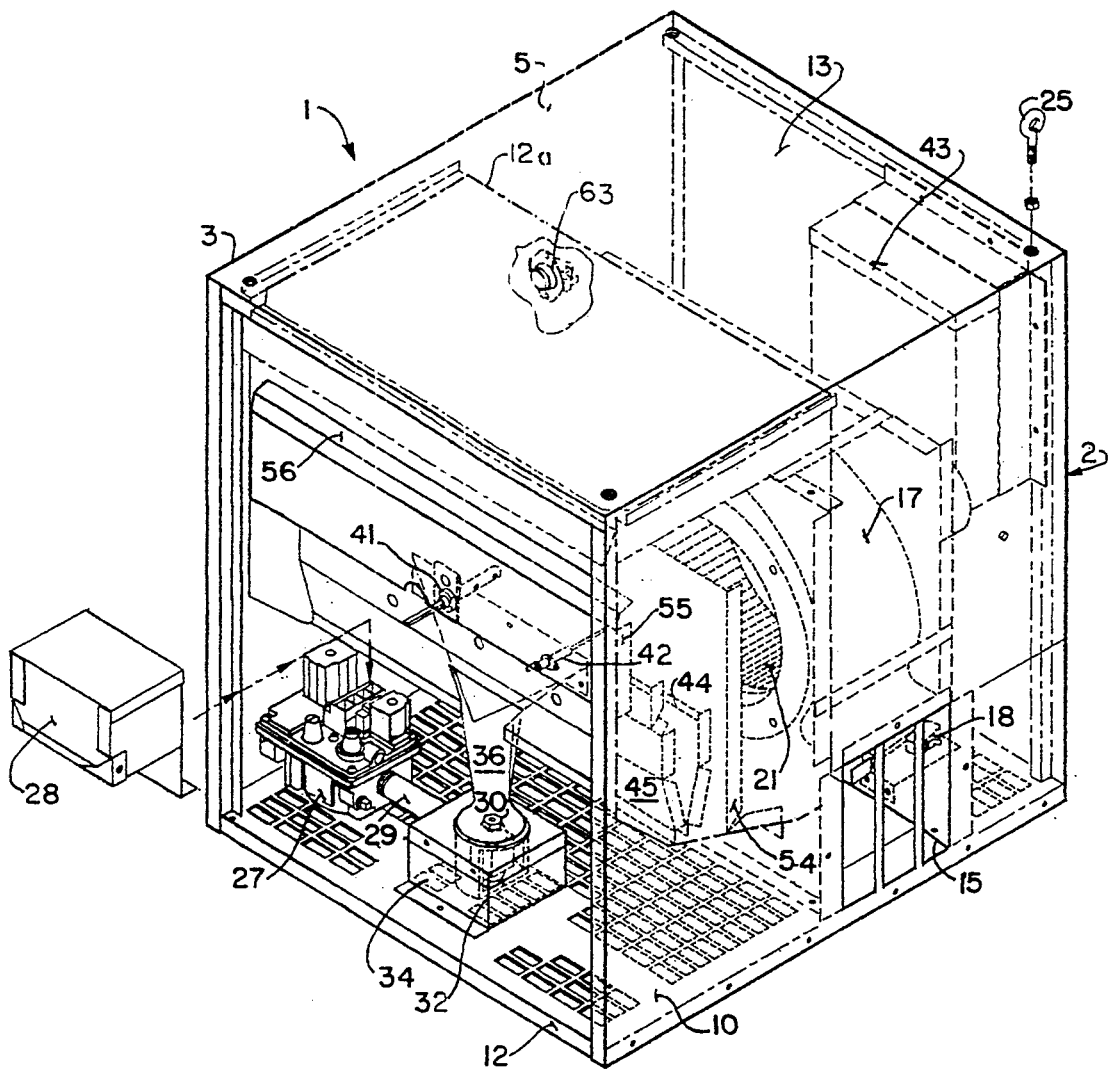
FIG. 1 is a partial perspective view of the burner assembly of the present invention, the other major components of the heater set forth in phantom to show an interior perspective.
Figure 4:
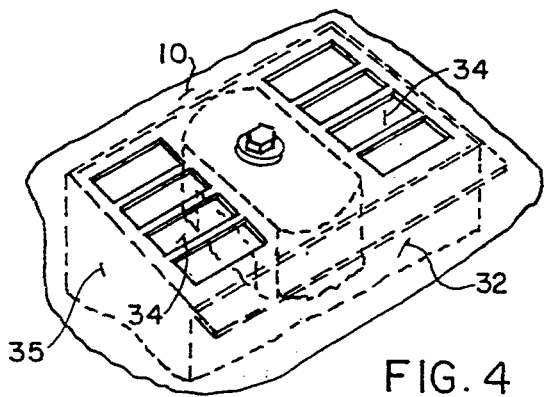
FIG. 4 is a bottom plan of the primary air inlet shroud of the present invention.
Figure 3:
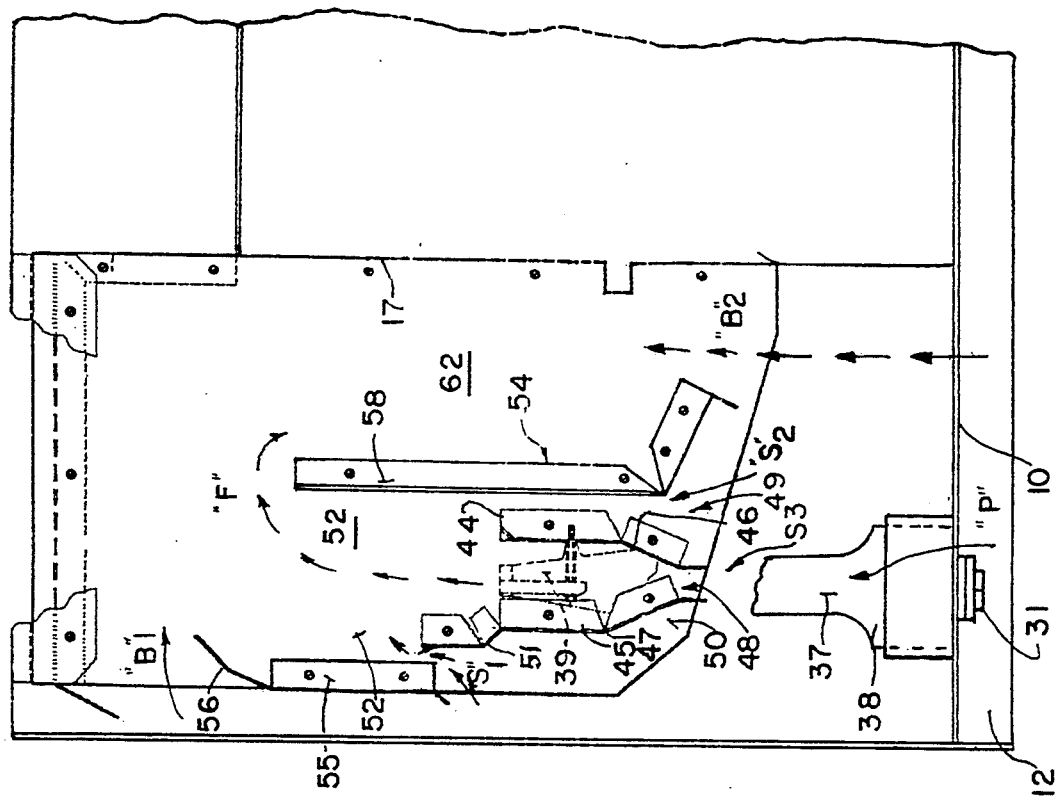
FIG. 3 is a partial side-elevational view of the heater assembly of the present invention, with a side wall removed, demonstrating the relationship between the burner manifold and the baffle system.
Figure 2:
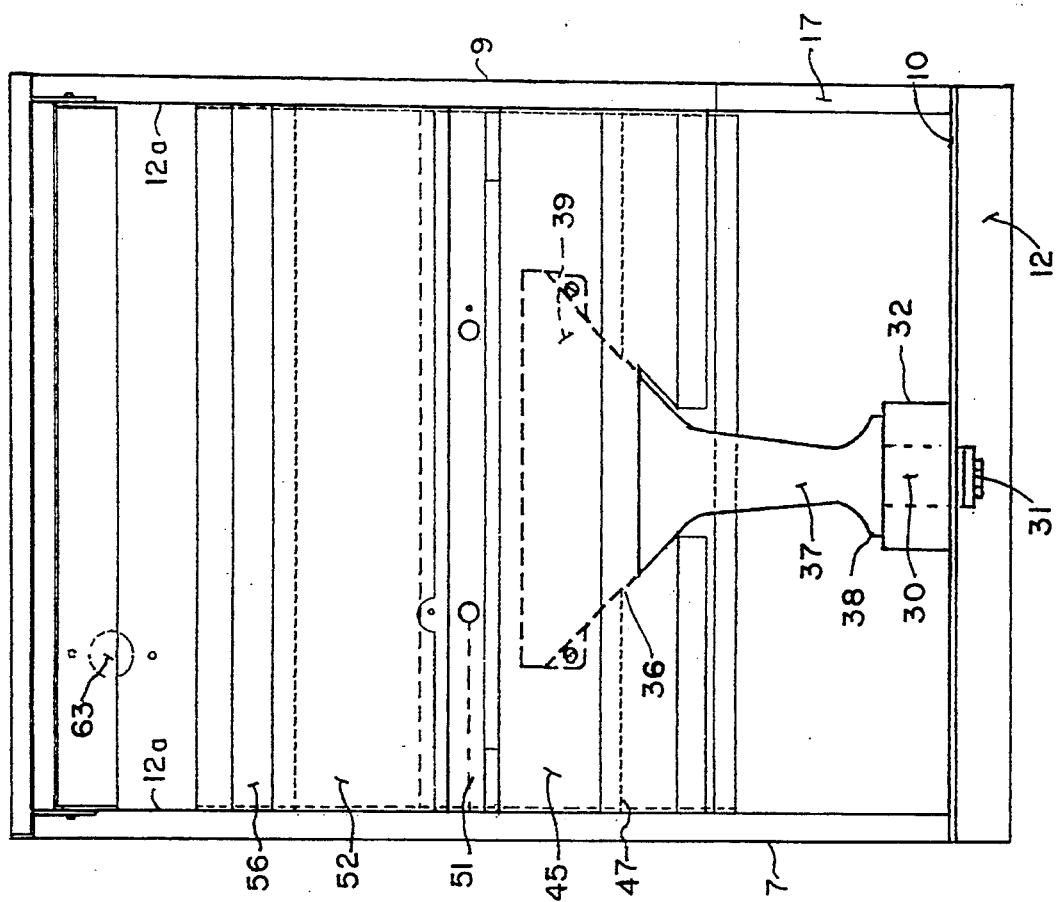
FIG. 2 is an end plan of the gas-fired heater of the present invention with an outer covering wall removed, showing the manifold and baffle assemblies therein.
Figure 5:
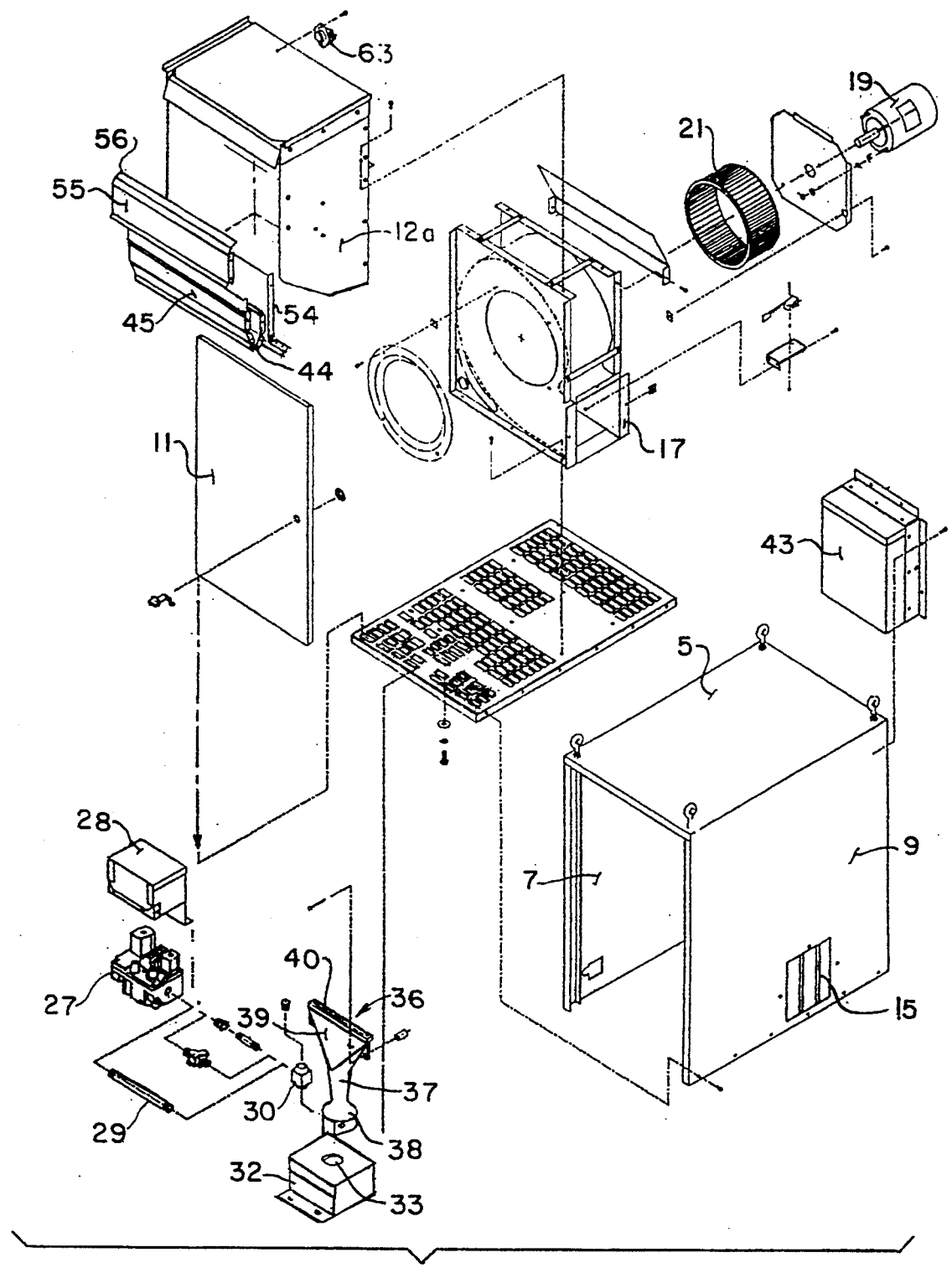
FIG. 5 is an exploded view of the heater of the present invention.

A self-contained direct gas-fired heater assembly of the present invention is shown generally as reference numeral 1 in FIG. 1. The functional components of heater 1 are contained in a housing 3 having top wall 5 opposed front and back walls 7 and 9, respectively, opposed door and end walls 11, 13, and lower grate-like floor 10 supported by a frame structure as at 12. Front wall 9 has a blower air outlet 15 formed therein generally constructed to allow the effluence of heated air therefrom or to cooperate with duct work for the conveyance of air for venting throughout a building or other structure.

Blower 17, monitored by air flow switch 18 may be operated through electrically connected motor 19 which causes the blower rotation and, through the movement of its vanes, as at 21, induces a volumetric flow of air through the housing 2 so as to draw a flame and heated air through the unique baffle-type deflector system as will be explained hereinafter.

Figure 6:
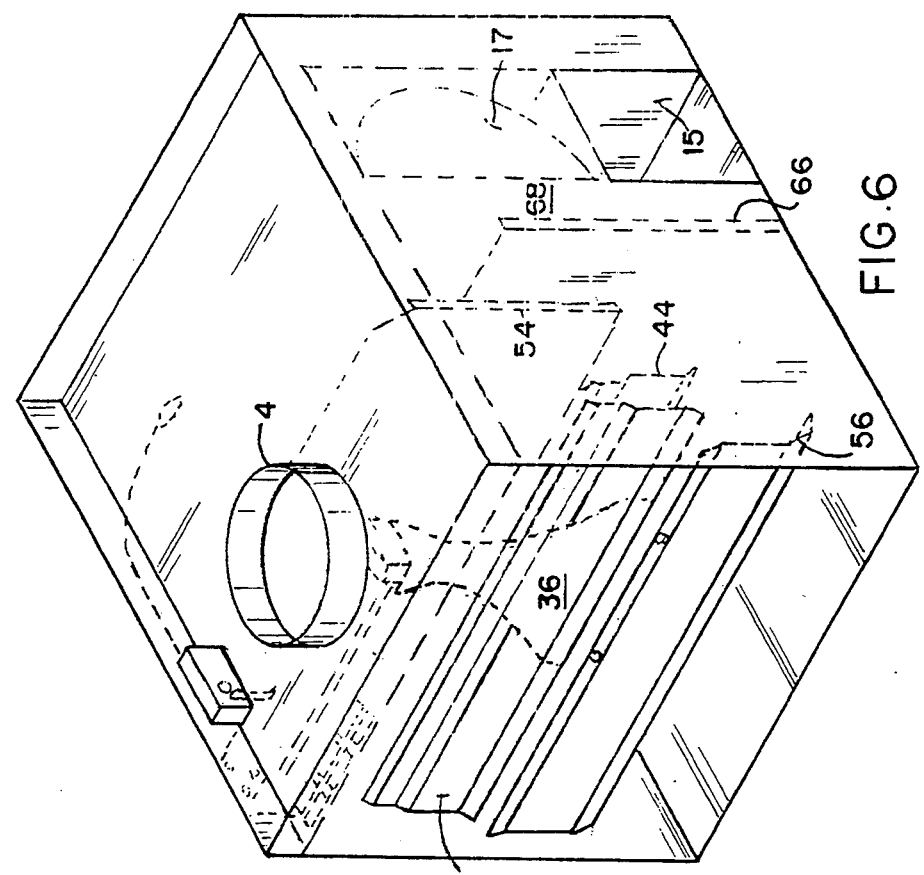
FIG. 6 is a perspective view of an alternative embodiment of the present invention of the type constructed for suspension from a ceiling and connection of inlet ducting for supplying combustion air from outdoors.
Figure 7:
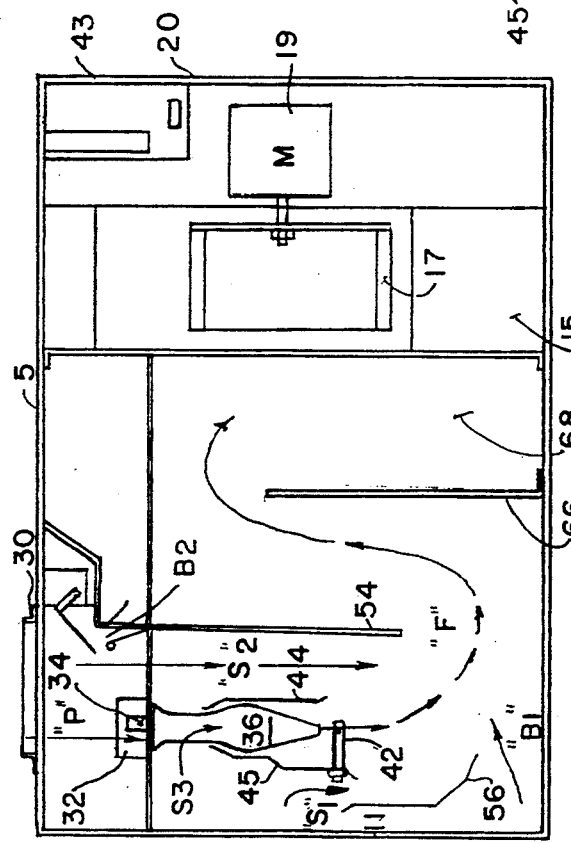
FIG. 7 is a partial schematic of the alternative embodiment as shown in FIG. 6.
Figure 8:
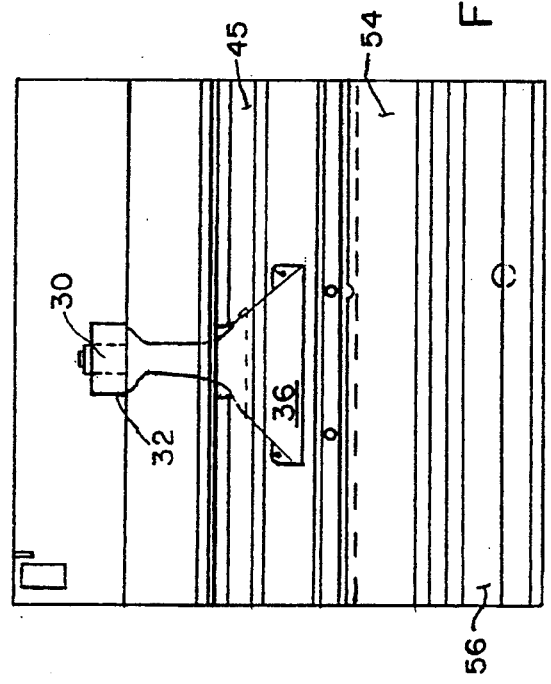
FIG. 8 is an end plan view of the embodiment as shown in FIG. 6, with its outer covering wall removed.

This type of heater may be suspended from a ceiling in an agricultural building or commercial building by eye bolts such as 25 and accepts, through grate-like floor 10, ambient air for combustion. In an alternative embodiment, as shown in FIGS. 6–8, the heater is designed to suspend from the ceiling and has housing 2 with air inlet duct 4 formed therein. Duct 4 cooperates with the outside environment to draw outside ambient air into the heater for combustion. The functional elements of this alternative embodiments are similar to those of the first embodiment, only the juxtaposition of the elements is changed to facilitate the inflow of outside air for combustion.

The burner assembly of both embodiments of the invention is unique, comprising a conventional gas regulator and valve 27 within a housing 28 which provides regulation of combustible gas to gas orifice/orifice elbow assembly 30 through a connecting gas pipe 29. The orifice elbow 30 is mounted to floor grate 10 with a bolt 31. Primary combustion air control shroud 32 is mounted on floor 10 enclosing intake 30 as well as enclosing inflow combustion air openings 34. The burner 36 is mounted through opening 33 in shroud 32.

A plurality of inflow air openings 34 in floor grate 10 are covered by the shroud 32, creating a primary combustion air inflow chamber 35. The number, size and arrangement of holes 34 have been predetermined so as to control and regulate the desired amount of primary combustion air that can flow upwardly into chamber 35 to surround and mix with the gas released from the gas orifice 30 in the burner assembly 36. The inflow of primary air into the shroud is shown generally at arrow P. This airflow is created by the combination of factors which include the momentum of the jet of gas fuel which entrains the combustion air causing an upflow into the venturi area of the burner throat 37 and the negative cabinet pressure created by the blower 17. It is desirable to carefully regulate the entrance of primary air through holes 34 into shroud 32 and burner 36 so as to have adequate control and proper proportioning of the ratio between the primary air as mixed with the combustible gases in order to assure both effective and maximum combustion, and reduce quenching, so as to reduce, at this location, the development of carbon monoxide as previously explained.

The primary air P and combustible gas are mixed together within burner manifold 36 which has an essentially tapering and conical lower portion 37 terminating at a flared skirt 38 which mounts over opening 33 in shroud 32. Burner manifold 36 has a flattened, horizontally elongated upper outlet portion 39 with a horizontal slot 40 formed therein as shown, to allow the effluence of a flame. An electric igniter 41 and flame rod 42 project into the area immediately above the burner 36 and are electrically connected to an electrical junction box 43, and electronic controls therein (not shown) provide adequate electrical supply to the said igniter 41. Electrical junction box 43 with the controls therein, also control the heater assembly and the associated blower motor 19.

A pair of opposed and uniquely configured flame shields comprised of first shield 44 and second shield 45 are mounted to and extend between walls of the firebox wrap 12a on opposite sides of manifold section 39 so as to constrict and conform the outflow of the flame from slot 40 and restricting the flow of secondary air in this area. Articulating points 46 and 47 allow the lower portion of shields 44 and 45, respectively, to angle inwardly toward the burner 36. An inner baffle-type deflector 54 is mounted to and extends between walls of the firebox wrap 12a at one side of and extending above shield 44. Another and outer baffle-type deflector 55 is mounted to and extends between walls of the firebox wrap 12a at the side of and just above shield 45. Combustion chamber 52 is formed between deflectors 54 and 55. The arrangement of shields 44 and 45 adjacent to the burner 36 and diverters 54 and 55 create secondary combustion air flow channels at 48, 49 and 50, respectively, so as to properly direct and divert the flow of secondary combustion air, shown as arrows S1, S2 and S3 for combustion downstream.

Shield 45 has an extension 51 formed thereon and appropriately angled to permit normal expansion of the flame without impingement on member 45, while further delaying the entrance of secondary combustion air S1 into the combustion chamber 52. Deflector 55 has an upper angled extension 56 thereon, angled in the optimum position so as to deflect a flame, shown as arrow "F" toward a second chamber 62 by the flow of bypass air B1 above the deflector 55. Additional bypass air, shown as arrow B2 entering chamber 62 through grate-like base 10 also allows for substantial mixing of an air supply with the heat of combustion downstream at the tip of flame F in the upper reaches of chamber 62. This arrangement allows the flame F to be drawn up and around baffle 54, as in the region 58, and into chamber 62 by flow-through air created by blower 17 but dissipate before the flame reaches the area of blower 17.

A high temperature limit sensor 63 electronically connected to controls in the housing 43 is designed to thermostatically limit temperature within the chamber through a conventional feed-back circuit.

In the second embodiment, shown in FIGS. 6–8, a second baffle 66 creating a second hot air chamber 68 intermediate baffle 54 and the blower 17 further limits the flame before reaching blower 17. This flame deflection structure is particularly useful as a safety feature when such heaters are used, for example, in a dry poultry house, or horticultural installations, where risk of fire is greater.

Variations or modifications to the structure of this burner assembly may occur to those skilled in the art upon reviewing the subject matter of this invention. Such variations or modifications, if within the spirit of this invention, are intended to be encompassed within the scope of any claims to patent protection issuing upon this invention. The description of the preferred embodiment provided herein is set forth for illustrative purposes only.

Having thus described the invention, what is claimed and desired to be secured by Letters Patent is:

1. In a direct gas-fired air heater having a housing, said housing having an access door, a burner assembly, means forming a combustion chambers in said housing, a blower, and a motor to power said blower, the improvement in the heater assembly comprising:
    said means forming said combustion chamber including a plurality of baffles,
    a burner having an open lower end, a gas inlet port communicating with said burner lower end, said burner operatively mounted over said gas inlet port and an upper end disposed to open into said combustion chamber;
    a primary combustion air inlet means operatively connected to said lower end of said burner and having openings for the controlled inflow of primary combustion air so as to permit an appropriate amount of primary air inflow to promote effective combustion, but without disruption when the heater access door is opened and closed,
    said burner having an open upper end cooperatively connected to said combustion chamber, a first and second opposed shields, one of each said shields being disposed on each side of said open upper end of said burner so as to direct a flame emitted from said upper end of said burner into said combustion chamber;
    a first of said baffles, disposed on a side of the first shield forming an air channel intermediate said first deflector and said shield to direct secondary combustion air toward an end of said combustion chamber;
    a second baffle-type baffle disposed also on a side of said second shield forming an air channel intermediate said shield deflector and said second shield to direct secondary air toward said end of said combustion chamber;
    a flame deflector formed on said second deflector having a inwardly projecting extension thereon to deflect said flame heat into a second chamber proximate said blower.

2. The invention of claim 1 wherein said gas-fired air heater is inverted, and suspended for directing its combusted flame downwardly into the housing and its formed combusion chamber.

3. The invention of claim 1 and wherein said gas-fired air heater capable of installation within an industrial building.

4. The invention of claim 1 and wherein said gas-fired air heater capable of installation within a commercial building.

5. The invention of claim 1 wherein said gas-fired air heater being installed within an agricultural building.

6. The invention of claim 1 wherein said gas-fired air heater disposed for installation within a horticultural building.

7. The invention of claim 6 wherein said gas-fired air heater being installed within a greenhouse.

8. In a direct gas-fire heater assembly for use in an agricultural and related building having a housing, a burner assembly, a blower assembly, a motor to power said blower, and a combustion chamber within said housing, the improvement in the heater assembly comprising:
    a burner having a first end with a first opening formed therein and second end with a second opening formed therein, said first opening disposed to house a combustible gas port and said second opening disposed to allow the outflow of a gas for forming a proximate combustible flame;

means for controlling the inflow of primary air for combustion operatively attached to said first opening of said burner;

a first deflector shield disposed on a first side of said gas outflow opening, and a second deflector shield disposed on a second side of said gas outflow opening, said first and second shields positioned so as to deflect said flame toward a combustion chamber;

a first and second baffle-type deflectors, said first baffle-type deflector being mounted proximate said first shield creating a secondary combustion air inflow path intermediate said first shield and first deflector, said second baffle-type deflector mounted proximate said second shield creating a secondary combustion air inflow channel between said second shield and said second deflector;

an inwardly projecting extension on said first baffle-type deflector disposed to deflect a flame from said combustion chamber toward such blower.

9. The invention of claim 8 wherein said burner has an essentially elongated conical base with said first opening formed therein and a substantially horizontally elongated upper end with said second opening formed therein further comprising a horizontal flame outlet slot.

10. The invention of claim 8 wherein said means for controlling the inflow of primary air further comprises a shroud, said shroud having an upper surface, four sidewalls depending therefrom defining a primary intake air chamber, and a base portion cooperatively connected to said sidewalls having a plurality of air inflow orifices of predetermined size and shape formed therein.

11. The invention of claim 9 and further comprising a combustion air inlet vent formed in said housing to cooperatively connect said means for controlling the inflow of primary air for combustion to the outside environment.

12. The invention of claim 8 wherein said gas-fired air heater is inverted, and suspended for directing its combusted flame downwardly into the housing and its formed combustion chamber.

13. The invention of claim 8 and wherein said gas-fired air heater capable of installation within an industrial building.

14. The invention of claim 8 and wherein said gas-fired air heater capable of installation within a commercial building.

15. The invention of claim 8 wherein said gas-fired air heater being installed within an agricultural building.

16. The invention of claim 8 wherein said gas-fired air heater disposed for installation within a horticultural building.

17. The invention of claim 16 wherein said gas-fired air heater being installed within a greenhouse.

* * * * *

UNITED STATES PATENT AND TRADEMARK OFFICE
CERTIFICATE OF CORRECTION

PATENT NO. : 5,399,086

DATED : March 21, 1995

INVENTOR(S) : Gary J. Potter, Samuel M. Baxter.

It is certified that error appears in the above-identified patent and that said Letters Patent is hereby corrected as shown below:

Claim 1, column 8, line 3, change "chambers" to ---chamber---; line 33, remove "baffle-type baffle", and insert therein ---of said baffles---; line 38, change "deflector" in the first instance, to ---baffle---.

Claim 15, column 10, line 22, change "beater" to ---heater---.

Signed and Sealed this

Sixteenth Day of May, 1995

*Attest:*

BRUCE LEHMAN

*Attesting Officer*     *Commissioner of Patents and Trademarks*